United States Patent [19]

Klein et al.

[11] 4,006,803
[45] Feb. 8, 1977

[54] WHEEL WITH BRAKE DISCS FOR RAIL VEHICLES

[75] Inventors: Willi Klein, Remscheid; Henning Rocholl, Radevormwald; Hermann-Josef Feldhoff; Alfred Otto, both of Remscheid, all of Germany

[73] Assignee: Bergische Stahl-Industrie, Remscheid, Germany

[22] Filed: July 11, 1975

[21] Appl. No.: 595,230

[52] U.S. Cl. .................... 188/218 XL; 188/264 A; 192/70.13

[51] Int. Cl.² ........................ F16D 65/12

[58] Field of Search .......... 188/71.6, 73.2, 218 XL, 188/264 A, 264 AA; 192/107 R, 70.12, 70.13, 70.16; 301/6 E

[56] References Cited

UNITED STATES PATENTS 3,295,641  1/1967  Eaton et al. .................... 188/218 X

FOREIGN PATENTS OR APPLICATIONS 1,183,932  12/1964  Germany ..................... 188/218 XL
1,214,265   4/1966  Germany ..................... 188/218 XL
   52,216  12/1966  Poland ......................... 188/218 XL Primary Examiner—George E. A. Halvosa
Attorney, Agent, or Firm—Walter Becker

[57] ABSTRACT

A rail vehicle wheel with brake discs, especially for disc brakes, according to which the brake discs, which may be or may not be divided, are arranged on one or both sides of the wheel. That side of the brake discs which faces toward the wheel disc is provided with radially extending cooling fins and by way of cam rests against the wheel disc. The outer and/or inner circumference of the brake discs is or are respectively engaged by preloaded elastic deformable holding members which in their turn are positively or frictionally connected to the wheel.

3 Claims, 4 Drawing Figures

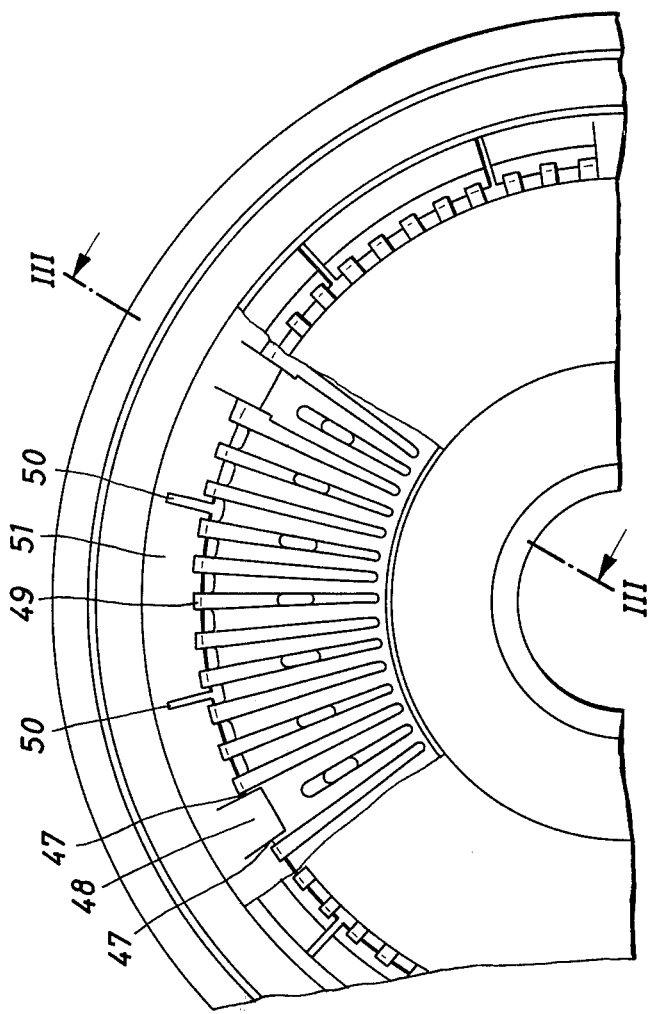
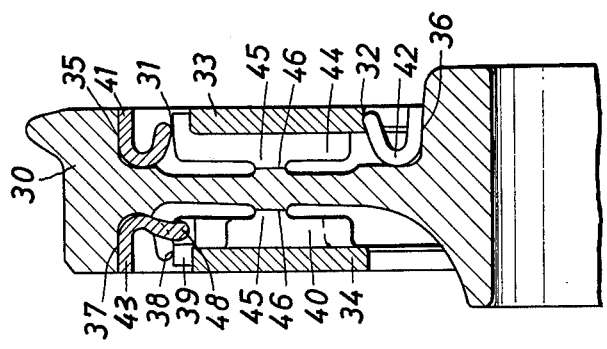

WHEEL WITH BRAKE DISCS FOR RAIL VEHICLES

The present invention relates to a rail vehicle wheel with brake discs in which the brake discs which, if desired, may be divided and are arranged on one or both sides of a wheel, while the brake discs on that side which is associated with the wheel disc are provided with radially extending cooling fins and through the intervention of cams rest against the wheel disc.

Wheels with brake discs have become known according to which the brake discs are provided with cast-on spokes which extend tangentially in such a way that they are able elastically to absorb and compensate for the increase in diameter brought about by the heating up during the braking operation. The drawback of these heretofore known wheels consist in that such brake discs are relatively difficult to manufacture and also their mounting causes certain problems.

Therefore, it has been suggested to secure the brake discs at their outer circumference through the intervention of additional rolling-in rings on the wheel rim or by pressing the brake discs into the wheel rim. Both constructions have the drawback that the brake discs engage the wheel rim which construction is not feasible with shrunk-on wheel rims because the pressing of the brake disc acts together with the heating up of the wheel rim during the braking operation in the same sense, namely, brings about a loosening of the shrink fit of the wheel rim.

It is, therefore, an object of the present invention to so connect the brake discs to the wheel that a simple mounting will be possible, if desired, even without disconnecting the wheel, while on the other hand, the connection of the brake discs will, in conformity with the present invention safely absorb movements and changes which occur during the heating up occurring during the braking operation.

It is still another object of this invention to provide a brake disc connection with the wheel, which will also facilitate the centering of the brake discs.

These and other objects and advantages of the invention will appear more clearly from the following specification, in connection with the accompanying drawings, in which:

FIG. 2 represents a modified connection according to the invention.

FIG. 3 represents a section taken along the line III—III of FIG. 2.

The rail vehicle wheel with brake discs according to the present invention is characterized primarily in that the outer end or inner circumference of the brake discs is engaged by an elastically deformable holding element under preload, said holding element being on one hand positively or frictionally connected to said wheel.

Advantageously, to this end holding elements in the form of brackets or clamps may be employed which either extend around the brake discs from the rear, or which are inserted on the wheel between the circumference and the opposite surface on the wheel.

The advantage of the connection according to the present invention of the brake discs on the wheel consist primarily in that the brake discs can expand and contract freely whenever this should be necessary due to the heating up, during the braking operation and a subsequent cooling. However, the brake will always remain centered so that no unbalance can occur which otherwise, especially at high driving speeds could cause undue oscillations or vibrations. Moreover, the brake discs are mounted and removed without the necessity of taking off the wheel when the discs are divided. Fundamentally, no additional screws, or the like, for connecting the two brake disc sections have to be employed because the holding elements so engage the brake discs that also divided discs will hold safely and will be centered and will also be held together.

In addition thereto, the clamps or brackets may be so designed that the frictional connection between the clamp and the brake disc will be completely sufficient for conveying or transferring the braking forces. On the other hand, it is also possible without difficulties, to provide additional means for transferring the braking forces from the wheel to the brake disc. In spite of these possibilities, the shrink-fit of a pressed-on wheel rim will not be affected or loaded by the connection of the brake discs, even if the brake disc should expand due to the braking heat.

With wheels which are particularly subjected to stresses, the connection of the brake discs may be so designed that the brake disc has no perforations or bores therethrough so that the wheel disc will not be weakened in any manner.

In addition to the above, it may be mentioned that the manufacture of the brake disc as well as of the wheel does not cause any additional difficulties as is the case when manufacturing rim ring bores of a sickle shape. No special dividing or pitch problems have to be solved as is the case with other types of connections.

Figure 1:
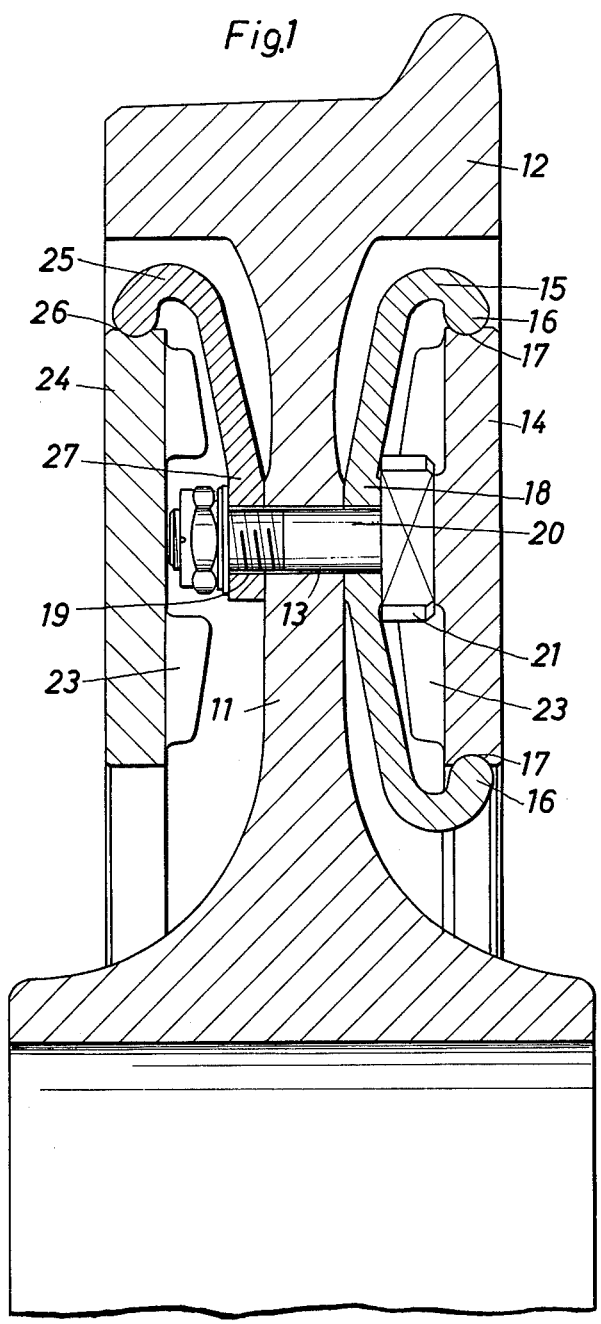
FIG. 1 illustrates a connection according to the invention with a clamp connected to the wheel disc.

Referring now to the drawings in detail, in the arrangement shown in FIG. 1, the wheel disc 11 of a rail vehicle wheel 12, known per se, is provided with a bore 13. One brake disc 14 is held by at least three clamps 15 which have their thickened ends 16 engage a corresponding groove provided in the outer and inner circumference of the brake disc 14. The ends 16 of the clamp 15 are preloaded so that the brake disc can be pulled out from clamp 15 only by employing a corresponding force.

Figure 1A:
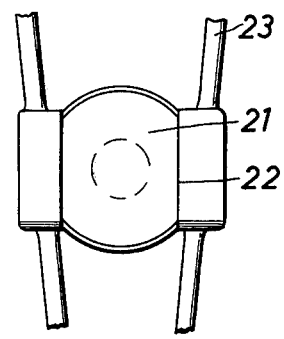
FIG. 1a shows details of the head of a bolt shown in FIG. 1.

The three clamps 15 form a unit with a ring 18. This clamping ring has bores 19 which correspond to bores 13 in the wheel disc 11. A connecting bolt 20 which is passed through both bores 13 and 19 can be held by a nut which is secured in its position by a cotter pin. The head 21 of bolt 20 is, as shown in FIG. 1a, provided with radial surfaces 22 by means of which said bolt rests against corresponding surfaces of a radial groove formed by two adjacent ribs or fins 23. The ribs 23 may be thickened or reinforced at those parts which carry the surfaces 22. By means of this groove, the braking force is transferred from the wheel to the brake disc without subjecting the clamping connection to any stresses. The clamp may also be held relatively light. The left portion of FIG. 1 shows that the brake disc 24 is held by means of a clamp 25 which rests under preload only against the outer circumference 26. Also, in this instance, the end of the clamp 25 is thickened or reinforced, and this end is located in an annular groove. Expediently, four clamps 25 are employed which together with a ring 27 form a unit connectable to the wheel by means of bolts 20. The bolts 20 must, when tightening the nut, produce the preloading of the clamp 25. Since naturally this preload must not be too high, the braking force is, through a radial groove, conveyed to the back of the brake discs to the correspondingly designed head of the bolt 20. With both designs according to FIG. 1, the brake disc 14, 24 will be able in response to a heating up during the braking operation to expand in radial direction without difficulties, whereby only the press-fit of the clamps becomes better. The clamps are expediently made of a relatively elastic material, especially steel so that the occurring elastic deformations will not exceed the elastic limit and no deformation of the clamp will occur. The deformation of the brake discs due to heat is furthermore reduced by the fact that the cooling fins 23 provided on the back of the brake discs and the open space remaining in circumferential direction between the clamps will result in a good air circulation and thereby in a good cooling of the discs. Advantageously, within the region of ring 18, 27 a resting surface may be provided on each cooling fin 23 so that the brake disc will be uniformly supported by the wheel disc over the entire circumference thereof.

FIGS. 2 and 3 illustrate a preferred embodiment of the invention according to which the wheel 30 is provided with surfaces 35, 36, 37 corresponding to the outer circumference 31, 38 and the inner circumference 32 of the brake disc 33, 34. The circumference 38 is formed by the ends 39 of the cooling fins 40, which ends project beyond the circumference of disc 34. Between the surfaces 31 and 35, and 32 and 36, as well as 37 and 38, one clamp each 41, 42 and 43 is inserted under preload in the form of a ring having the cross section of a U lying on one leg. The reinforced ends of the clamps are located in corresponding annular grooves provided in the surfaces 31, 32 and 38. The brake discs 33, 34 rest against a resting surface 46 provided on the wheel disc and does so through the intervention of cams 45 arranged on the fins 40, 44 or separate therefrom.

The transmission of the braking forces is with the design employing two clamps 41 and 42 effected by frictional connection between the surfaces 35 and the clamp as well as surface 31 and clamp, as well as surface 32 and clamp, and surface 36 and clamp. In this connection, therefore, no special elements are required for transferring the braking forces.

With the embodiment employing only one clamp, for reasons of safety a positive connection is effected between clamp 43 and brake disc 34. More specifically, according to FIG. 3, the inner leg of the U-shaped clamp 43 is provided with two slots 47, the piece 48 which remains between the slots 47 will then have such a width that the piece 48 fits precisely between two adjacent fins 49. There are additional slots 50 provided on the inner leg 51 whereby a better spring of this leg will be obtained. This is important when extremely high temperatures have to be coped with in view of a frequent braking. In such an instance, the brake disc will enlarge considerably more so that with an insufficient spring, it would be possible to reach the limit of the elasticity. In order safely to avoid such a situation, the slots 50 are provided.

Advantageously, the clamps form a ring whereby, in particular on the surface 35, 36 and 37, the pressure can be brought up to the necessary height. However, it is also possible without difficulties to insert three or more individual clamps, in which instance, individual clamps are provided with a piece 48, whereas other clamps will not have such piece. This piece 48 may, of course, also be provided on the clamps 41 or 42, if these clamps engage only the circumference 31 or 32 of the brake disc proper.

All designs of the present invention, as outlined above, have in common the possibility to employ not only undivided, but also divided brake discs. While in such an instance it is expedient to design the clamps as rings, it will be appreciated that at any rate not only the brake discs will be held on the wheel, but the clamps will hold together also the two sections of the discs without the necessity of providing additional connecting means for the two disc sections. Heretofore, such simplicity could not be obtained. Thus, it will be possible according to the present invention to pull off the brake discs on both sides of a rail wheel without the necessity of pulling the most pressed-on wheel from the axle. The new brake disc can then be mounted again in as simple a manner as the replaced disc was pulled off. With a correct selection of the clamps, the connection according to the invention may also be employed with such wheels with which the wheel rim is pressed onto the wheel disc. The positive connection between brackets and wheel or brackets and brake disc may particularly advantageously be effected by cementing. For purposes of interfering with the heat transfer, also between the clamps and the brake discs an insulating intermediate layer may be provided. Instead of the reinforced ends 16, the ends of the clamps may also be bent to form a round section or may be doubled, or the end of the clamp may entirely or partially extend around the brake disc in the manner of a hook.

With the clamps 15 and 25, also disengaging means may be provided which are directed toward the brake disc and which extend up to between the cooling fins 23 or also between correspondingly arranged recesses or cams. In such an instance, the transfer of the braking force will be effected through the intervention of these elements so that the follower illustrated in FIG. 1a can be omitted.

It is, of course, to be understood that the present invention is, by no means, limited to the specific showing in the drawings, but also comprises any modifications within the scope of the appended claims.

What we claim is:

1. A rail vehicle wheel, having a radially outer rim and a central hub and also comprising wheel disc means interconnecting said hub and said rim, which includes: brake disc means having an inner and an outer circumference and arranged at least on one side of said wheel disc means, that side of said brake disc means which faces said wheel disc means being provided with radially extending cooling fins, force transmitting means interposed between said wheel disc means and said brake disc means for transmitting forces acting upon said brake disc means onto said wheel disc means, preloaded elastically deformable holding means connected to said wheel and holding under pre-load at least one of said inner and outer circumferences of said brake disc means, said holding means including clamping means positively connected to said wheel disc means, and bolt means connecting said clamping means to said wheel disc means and having a head with radial surfaces which is located between said clamping means and the respective adjacent brake disc means, said last mentioned disc means having that side thereof which faces the respective adjacent bolt head provided with a groove having radial and axis-parallel surfaces engaged by said radial surfaces of said bolt head.

2. A rail vehicle wheel according to claim 1, in which said groove is formed by two cooling fins arranged adjacent to each other.

3. A rail vehicle wheel according to claim 1, in which said clamping means includes an end which rests against the respective adjacent brake disc means and is thicker than the remaining adjacent portion of said last mentioned clamping means.

* * * * *